Jan. 13, 1953 J. O. EDSON 2,625,604

QUANTIZED PULSE TRANSMISSION WITH FEW AMPLITUDE STEPS

Filed Nov. 13, 1950 2 SHEETS—SHEET 1

INVENTOR
J. O. EDSON
BY Hugh S. Wertz
ATTORNEY

Jan. 13, 1953 J. O. EDSON 2,625,604

QUANTIZED PULSE TRANSMISSION WITH FEW AMPLITUDE STEPS

Filed Nov. 13, 1950 2 SHEETS—SHEET 2

INVENTOR
J. O. EDSON
BY
Hugh S. Wertz
ATTORNEY

Patented Jan. 13, 1953 2,625,604

UNITED STATES PATENT OFFICE 2,625,604

QUANTIZED PULSE TRANSMISSION WITH FEW AMPLITUDE STEPS

James O. Edson, Warren Township, Somerset County, N. J., assignor to Bell Telephone Laboratories, Incorporated, New York, N. Y., a corporation of New York Application November 13, 1950, Serial No. 195,228

5 Claims. (Cl. 178—43.5)

Figure 1:
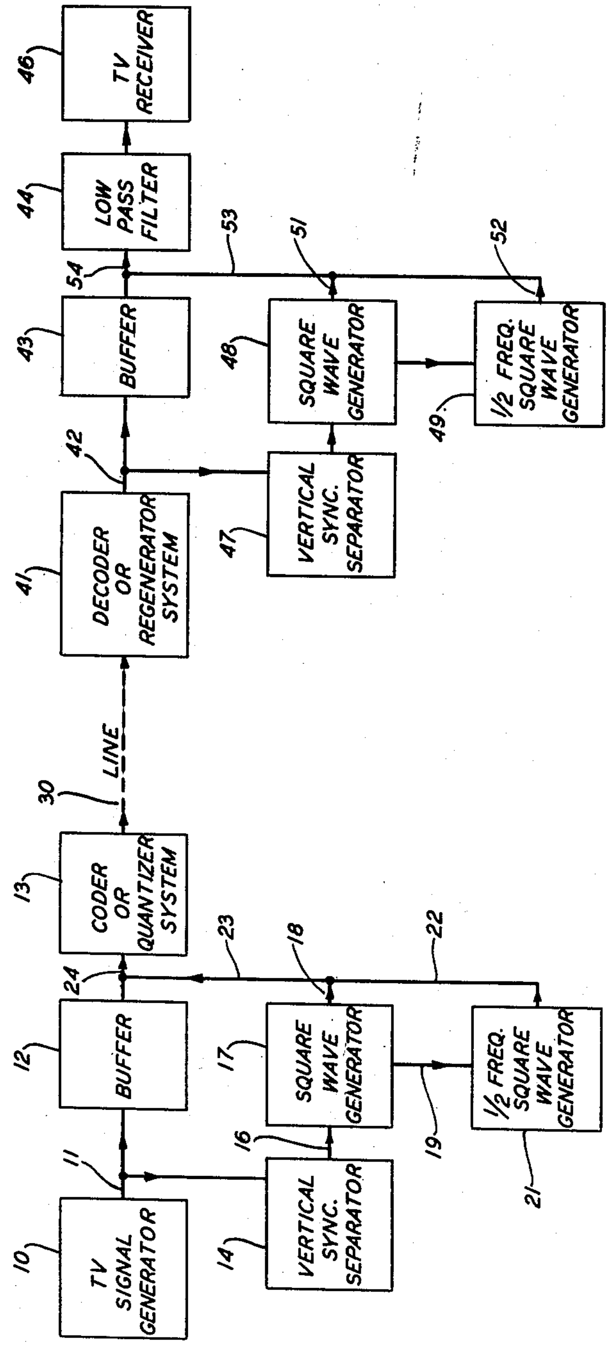

This invention relates to quantized communication systems and more particularly, but not exclusively, to pulse code modulation television systems.

The principal object of the present invention is to effect a reduction in the number of steps of brightness required for the satisfactory reproduction of intelligence, such as, for example, a television image, by pulse code modulation.

Another object of this invention is to effect a redistribution or a masking of the "noise" arising from the process of quantizing in the preparation of a signal for transmission so that the tendency in such systems to develop noticeable amounts of regularly repeated noise effects, or, in television systems, well-defined "contour lines" between adjacent amplitude levels of quantization, as the number of steps is reduced, is, to a considerable degree, counteracted.

Numerous intelligence transmission systems employing quantization of signal samples are well-known to those skilled in the art. By way of example, reference may be had to the articles "Pulse Code Modulation" by H. S. Black and J. O. Edson, appearing in the transactions of the "American Institute of Electrical Engineers," volume 66, pages 895–899 (1947); "Telephony by Pulse Code Modulation" by W. M. Goodall, appearing in the Bell System Technical Journal, volume 26, July 1947, at pages 395–409; and "An Experimental Multichannel Pulse Code Modulation System of Toll Quality" by L. A. Meacham and E. Peterson, published in the Bell System Technical Journal, volume 27, January 1948, pages 1–43. Of interest also in connection with some of the systems using quantization is the article entitled "Electron Beam Deflection Tube for Pulse Code Modulation" by R. W. Sears, published in the Bell System Technical Journal, volume 27, January 1948, pages 44–57.

The basic features in the operation of such systems are (1) the original signal to be transmitted is sampled, usually at a rate slightly in excess of twice the highest frequency present in the signal, to create a pulse-amplitude modulated signal representative of the original signal, (2) the samples are individually quantized, that is, each is classified as falling within a particular one of a plurality of amplitude levels or steps, (3) for pulse code modulation, each quantized sample is converted into a plurality of pulses of equal amplitude spaced in time to represent the proper amplitude level or step in an appropriate and convenient code system, (4) the code pulses are transmitted to a receiving station where they are decoded and converted back into a pulse-amplitude modulated signal, and (5) the pulse-amplitude modulated signal thus obtained at the receiver is converted back into a signal having substantially the characteristics of the original signal.

In systems like those above described, the processes of "sampling" and "quantization" introduce perceptible amounts of unwanted electrical energy having the general character of "noise" but usually distinguishable from the latter by having a regularly repetitive character, whereas "noise" is normally of a random and irregular character.

The lower the number of steps or amplitude levels into which the pulse-amplitude modulated signal (obtained by the sampling of the original signal) is quantized, the more troublesome is the unwanted regularly recurrent energy introduced by the quantizing process, since its predominant frequencies are more likely to fall within the same range of frequencies as that employed in the transmission of the unwanted signal. Consequently, although a relatively small number of steps or levels (16 to 32, for example) would suffice in many instances to enable the recovery of a good quality of reconstruction of the original signal at the far or receiving end of the system, this unwanted energy introduces appreciable distortion or interference. This distortion or interference in the case of audio signals appears as regularly repetitive "noise," and, in the case of video signals, as unwanted "contour lines" in the picture on the cathode ray tube screen where changes of shading along definitely distinguishable lines become apparent.

In a copending application of W. M. Goodall, Serial No. 192,578, filed October 27, 1950, there is described a system in which the above-mentioned objectionable results are to a large extent mitigated by injecting an additional square wave into the original signal, the square wave having an amplitude substantially one-half that of a quantizing step and a frequency equal to one-half the sampling frequency so that half of the samples are caused to fall into the next higher or the next lower step than would be the case in the absence of the additional square wave. The effect obtained is virtually that which would be obtained if the number of quantizing steps were doubled, but it is, of course, much easier, cheaper and convenient to introduce such a square wave than to provide for the actual doubling of the number of quantizing steps as in earlier methods.

The present invention, to be described in detail below, relates to an alternative arrangement for producing results similar to those described by Goodall. More specifically, use is made of lower square wave frequencies. Moreover, a plurality of square waves of different frequencies are combined to produce a composite wave which is injected into the signal to produce the effect of even greater multiplication of the effective number of quantum steps as compared with the Goodall arrangement.

Figure 2:
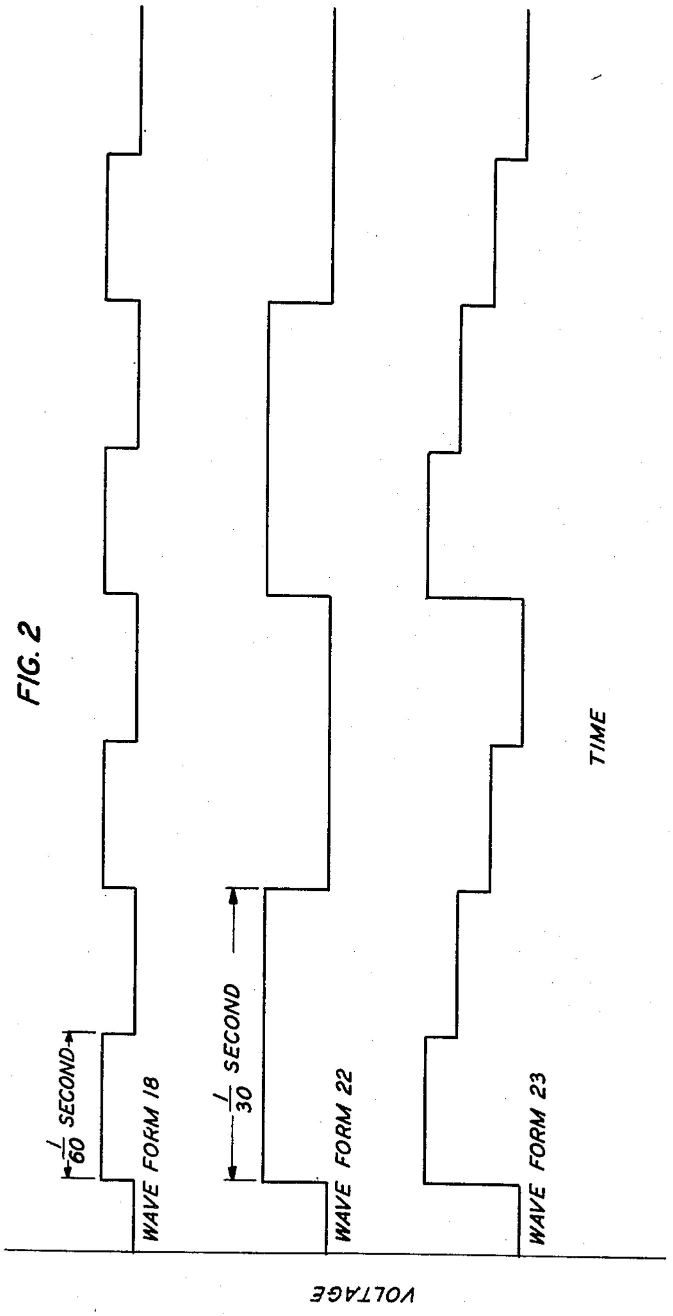

The invention will be more fully understood by reference to the following detailed description and the accompanying drawing forming a part thereof, in which:

Fig. 1 is a simple block diagram of an illustrative embodiment of the invention; and Fig. 2 illustrates certain wave forms which are of interest in the operation of the embodiment shown in Fig. 1.

Although the invention is applicable to pulse code modulation transmission of all types of signals, the description will be for simplicity of exposition in terms of television image signals. The number of quantum steps which must be used, when a television signal is to be transmitted by quantized pulse transmission means, is fixed by the requirement that the steps must not be readily visible when a slowly moving picture is being transmitted. Where the background of the transmitted picture changes gradually from light to dark, transmission by quantized systems results in sharply defined contours having a change of brightness corresponding to the interval between successive steps in the quantized transmission. With a simple binary system of PCM transmission, 6 or 7 digits are usually necessary (that is, 64 or 128 quanta) to transmit satisfactorily a television signal.

It is a notorious fact that when the motion of the television image is rapid, the definition need not be as sharp as at other times. It is also well-known that the human eye is unable to follow a small amount of flicker occurring at a relatively low rate. In the system of Fig. 1, these two phenomena are taken advantage of to permit a reduction in the number of digits required in a PCM television transmission. The number of steps used in one frame, field or line can be, for example, reduced to one-half or one-quarter the number that would be detected by an observer when conventional quantized transmission is used. Depending upon whether the number of levels is to be reduced by two or by four, this is accomplished by changing the quantizing levels at the transmitter and the corresponding reproduced pulse amplitudes by one-half or by one-quarter at successive time intervals. This change can, for example, consist of a change in the bias of the transmitter coder and receiver decoder or it can consist simply of the introduction of suitable rectangular waves in the input signal and in the output of the decoder.

In the illustrative embodiment of the invention which is shown in Fig. 1, the period chosen for use of a particular level of quantization is one field scanning time. It is, of course, within the practice of the invention to use a different switching frequency (such as, for example, frame or line frequency), but it will suffice to explain the invention in terms of field-period switching. It is obvious that exactly the same principle of operation obtains no matter what switching frequency is employed. In Fig. 1, the signal 11 from a television signal generator 10 passes through a buffer 12, which comprises simply an amplifier having little transmission in the reverse direction, to a coder or quantizer circuit 13.

The label "coder system" used in the drawing in connection with the box 13, is applied to circuits for sampling, quantizing and coding while the term "quantizer system" applies to circuits for sampling and quantizing only. Sampling circuits can, for example, take the form shown in Fig. 12 (*b*) at page 27 of the above-mentioned article by Meacham and Peterson. A quantizing and coder circuit arrangement is shown at Fig. 2 on page 47 of the above-mentioned Sears article. If the coding step is omitted, the coding operation of the coding tube can be omitted.

The signal 11 also passes through a vertical synchronizing signal separator 14 which picks up the vertical synchronizing pulses of the television signal and delivers a pulse at the beginning of each field. Any well-known type of synchronizing signal separator, such as one of the various kinds used in commercial television receivers, can be used. These pulses 16 actuate a square-wave generator 17 (such as, for example, any well-known multivibrator square-wave generator) which puts out a square-wave signal 18 having one value for one-sixtieth of a second and a second value for the next sixtieth of a second. (It is assumed, for simplicity of exposition, that the standard RMA television signal of 525 lines per frame and 30 frames per second is being used.) The difference in voltage between these alternative values of output from the square-wave generator can, in accordance with the invention, be equal to one-quarter of the difference between succeeding quantum levels in the coder or quantizer. Auxiliary pulses 19 derived from the first square-wave generator 17 [such as by a differentiation (not shown), for example] drive a second square-wave generator 21 at one-half the frequency of the first generator. The second generator 21 can be, for example, a conventional multivibrator circuit adapted to have a complete cycle within twice the period of that of the generator 18. The output 22 of this square-wave generator has one constant value for one-thirtieth of a second and a second constant value for the succeeding thirtieth of a second. The difference between these two constant values of output is, in the example of practice being discussed, one-half of the step size in the coder or quantizer.

The wave forms 18 and 22 are illustrated in Fig. 2. They are, as shown in Fig. 1, superimposed so as to yield a resultant wave form 23, which is also illustrated in Fig. 2. This composite wave 23 has, as is evident from the figure, four different levels of output. It is added to the television signal which passes through the buffer 12 and the combined signal 24 is applied to the coder or quantizer circuit 13 and transmitted over the transmission line 30 to the receiving decoder or regenerator circuit 41. Suitable decoders are shown on pages 36 to 38, inclusive, of the above-mentioned Meacham and Peterson article. The regenerator circuit can be like the quantizer mentioned above. Instead of being simply added to the television signal, this composite wave form 23 can be utilized to shift the bias in the transmitting wave coder 13, but since the result is the same so far as the practice of the invention is concerned, it will be simpler to speak in terms of addition.

Injection of the composite output 23 of the square-wave generators into the television signal results in changing the picture signal voltage required to reach a specified code in each of four successive fields. Thus, each contour that would exist in a slowly changing picture is broken up into four equally spaced contours, each of which exists in one field out of four successive fields. Injection at the receiver of a similar composite wave with suitable polarity at the output of the decoder results in adjusting each of the output pulses to the mean of the range of signal voltage required to reach the corresponding code at the transmitter input. Thus, four times as many possible values exist as would exist without the added square waves.

The output 42 of the receiver decoder 41 passes through a buffer amplifier 43 to a low-pass filter 44 and then to a standard television receiver 46. The output 42 of the decoder also passes to a vertical synchronizing signal separator 47, which separates the vertical synchronizing pulses and operates square-wave generators 48 and 49, which are similar to those used at the transmitter. The output 51 of square-wave generator 48 is of the same frequency as the output 18 of square-wave generator 17 at the transmitter and the output 52 of the square-wave generator 49 is of the same frequency as the output 22 of square-wave generator 21 at the transmitter. The polarity of the square-wave generators 48 and 49 at the receiver is, however, made opposite to that used at the transmitter, so that the combined output 54 of the square-wave generators and the buffer 43 in any pulse interval corresponds to the mean value of the range of inputs required to generate the particular corresponding code or quantum level. As at the transmitter, the outputs 51 and 52 of the square-wave generators are combined to form a composite square-wave 53, which is in turn combined with the output of the buffer to yield the signal 54, which was discussed above.

It is perfectly obvious that the same techniques discussed above may be applied using the scanning line, for example, as the basic time interval rather than the field. In this case, the synchronizing signal separators 14 and 47 of Fig. 1 are, of course, line synchronizing signal separators rather than vertical synchronizing signal separators and the half periods of the square-wave generators 17 and 48 and 21 and 49 are 63.5 microseconds and 127 microseconds, respectively. In all other regards, the operation is thoroughly similar. The effective level of quantization changes by one-quarter step in each of four successive line intervals, and then the cycle repeats. Since, however, the number of lines in a frame is odd, the cycle is not the same in successive frames, but repeats every fourth frame. It is, of course, also possible to combine two or more methods of operation. Thus, for example, one square-wave generator can be operated at line frequency and a second square-wave generator can be operated at field frequency, and their outputs can be combined in the same manner as has been described. With any of the suggested arrangements, the average intensity received at a given spot with a stationary image is corrected within a tolerance one-quarter as great as would be obtained with the same number of levels of quantization but lacking the injected square waves. Except for minor fractional effects, this gives a result comparable to that which would be obtained by adding two digits to a binary PCM transmission system or by multiplying the number of quantum levels in any quantized system by four. Thus, a five-digit PCM system which operates in accordance with the invention performs approximately on a par with a seven-digit (128 step) system which operates in accordance with ordinary present-day techniques. The advantages of a system in accordance with the invention in terms of reduction of channel capacity and saving of bandwidth are thus manifest.

It is to be understood that the above-described arrangements are illustrative of the application of the principles of the invention. Obviously, numerous other arrangements may be devised by those skilled in the art without departing from the spirit and scope of the invention. For example, simple square waves rather than composite waves (23) can be injected into the message waves to produce an effective doubling rather than an effective quadrupling of the number of quantum levels.

What is claimed is:

1. In a transmission system, at the transmitting terminal a message wave source, quantizing means adapted for sampling an input signal and classifying each sample as falling within a particular one of a plurality of different amplitude steps, means for superimposing on the message wave a wave of a predetermined repetition rate and of an amplitude less than the difference between successive amplitude steps characterizing the quantizing means, means for applying the combined wave as an input signal to the quantizing means, and means for utilizing the output of said quantizing means for transmission to a receiving terminal, and at the receiving terminal, means for generating a replica of the combined wave applied to the quantizing means, and means for superimposing thereon a wave of identical repetition rate and amplitude, but of the opposite polarity, as that superimposed on the message wave at the transmitting terminal.

2. A transmission system according to claim 1 in which the transmitting and receiving terminals further include wave generating means for developing square waves of amplitudes approximately one-half the difference between successive amplitude steps characterizing the quantizing means for superposition on the message wave.

3. A transmission system according to claim 1 in which the transmitting and receiving terminals include means for generating waves of stepped form for superimposing on the message wave.

4. In a television transmission system, at the transmitting terminal a television wave source, quantizing means adapted for sampling an input signal and classifying each sample as falling within a particular one of a plurality of different amplitude steps, means for separating a synchronizing signal from the television wave, wave generating means controlled by this synchronizing signal, the amplitude of whose waves is less than the difference of successive amplitude steps characterizing the quantizing means, means for applying the television wave and the wave generating means output as an input to the quantizing means, and means for utilizing the output of said quantizing means for transmission to the receiving terminal, and at the receiving terminal means for generating a replica of the signal applied as an input to the quantizing means, means for separating a synchronizing signal from the television wave equivalent to the synchronizing signal derived at the transmitting terminal, and means including wave generating means controlled by the synchronizing signal for superimposing on the replica derived a wave of equal amplitude and repetition rate, but of opposite polarity, as that of the wave generating means at the transmitting terminal.

5. A television transmission system according to claim 4 which includes at the transmitting and receiving terminals vertical synchronizing separator means for deriving vertical synchronizing signals from the television wave for control of the wave generating means.

JAMES O. EDSON.

No references cited.